United States Patent
Brasse et al.

(10) Patent No.: US 8,335,309 B2
(45) Date of Patent: Dec. 18, 2012

(54) METHOD AND COMMUNICATION TERMINAL FOR DETECTING THE STATUS OF A TELEPHONE RECEIVER

(75) Inventors: Oliver Brasse, Witten (DE); Ulrich Hardebusch, Bocholt (DE)

(73) Assignee: Siemens Enterprise Communications GmbH & Co. KG, Munich (DE)

( * ) Notice: Subject to any disclaimer, the term of this patent is extended or adjusted under 35 U.S.C. 154(b) by 167 days.

(21) Appl. No.: 12/676,480

(22) PCT Filed: Sep. 4, 2007

(86) PCT No.: PCT/EP2007/007706
§ 371 (c)(1),
(2), (4) Date: Jul. 27, 2010

(87) PCT Pub. No.: WO2009/030256
PCT Pub. Date: Mar. 12, 2009

(65) Prior Publication Data
US 2010/0284529 A1    Nov. 11, 2010

(51) Int. Cl.
*H04M 1/00* (2006.01)
(52) U.S. Cl. .................. 379/377; 379/388.02
(58) Field of Classification Search .......... 379/377, 379/388.02
See application file for complete search history.

(56) References Cited

U.S. PATENT DOCUMENTS

| | | | | |
|---|---|---|---|---|
| 4,922,529 A | * | 5/1990 | Kiel | 379/377 |
| 5,327,493 A | * | 7/1994 | Richmond et al. | 379/372 |
| 5,369,697 A | * | 11/1994 | Murray et al. | 379/361 |
| 5,471,525 A | * | 11/1995 | Domoto et al. | 379/247 |
| 5,483,593 A | * | 1/1996 | Gupta et al. | 379/386 |
| 5,537,556 A | * | 7/1996 | Mundkur | 710/310 |
| 5,559,870 A | * | 9/1996 | Patton et al. | 379/106.03 |
| 5,835,585 A | | 11/1998 | Morse | |
| 6,122,346 A | * | 9/2000 | Grossman | 379/68 |
| 6,694,019 B1 | * | 2/2004 | Song | 379/406.04 |
| 6,744,887 B1 | * | 6/2004 | Berstein et al. | 379/406.08 |

FOREIGN PATENT DOCUMENTS

| | | |
|---|---|---|
| WO | 85/00948 A1 | 2/1985 |
| WO | 2005/096600 A1 | 10/2005 |

OTHER PUBLICATIONS

International Search Report dated Apr. 24, 2008 for PCT/EP2007/007706 (Form PCT/ISA/210).
International Preliminary Report on Patentability for PCT/EP2007/007706 (Form PCT/IB/373 and PCT/ISA/237) (English Translation), Apr. 7, 2010.

* cited by examiner

*Primary Examiner* — Simon Sing
(74) *Attorney, Agent, or Firm* — Buchanan Ingersoll & Rooney PC

(57) ABSTRACT

The invention relates to a method for detecting the status of a telephone receiver (H) for a communication terminal (EG), wherein the telephone receiver (H) is equipped with a microphone (M) and with a loudspeaker (LS). The loudspeaker (LS) of the telephone receiver (H) is used to output a defined tone signal, and this tone signal is simultaneously picked up again by means of the microphone (M) of the telephone receiver (H). The tone signal picked up is analysed, with at least one value for at least one parameter of the tone signal picked up being ascertained, and the at least one value is used to determine the status of the telephone receiver (H).

16 Claims, 1 Drawing Sheet

METHOD AND COMMUNICATION TERMINAL FOR DETECTING THE STATUS OF A TELEPHONE RECEIVER

CROSS-REFERENCE TO RELATED APPLICATIONS

This application is the U.S. national phase under 35 U.S.C. §371 of PCT International Application No. PCT/EP2007/007706, filed on Sep. 4, 2007, and incorporated by reference herein.

BACKGROUND OF THE INVENTION

1. Field of the Invention

Embodiments relate to methods for detecting the status of a telephone receiver and communications terminals with a telephone receiver.

2. Background of the Art

Communications terminals (telephones or similar devices) for voice communications are generally equipped with telephone receivers (frequently also called "handsets"), which feature a loud speaker (earpiece) and a microphone (mouthpiece) and are connected to a base device (the actual communications terminal) or a base station by means of an access line or a wireless connection. Furthermore, other components of the communications terminal can also be integrated into a telephone receiver, for example, a keypad, a display device, etc., so that here, in the broader sense, common cordless telephones or cell phones also constitute telephone receivers. So-called "headsets" in non-wireless or wireless ("BLUETOOTH® certified headsets") models are also telephone receivers.

Besides functioning as a microphone and loudspeaker, a telephone receiver, at least in the case of commonly used non-wireless communications terminals (desk telephones), also controls the receiving (incoming calls) and the ending of a communication connection in that this receiver is removed from or placed on the base device of the communications terminal. For this purpose, the communications terminal (base device) is generally equipped with a so-called hook switch, a photoelectric sensor, or a magnetic switch ("reed contact"), in order to detect the status (on-hook, off-hook) of the telephone receiver.

There are also known devices in which a pressure switch is integrated into the surface of the telephone receiver, which detects whether or not the telephone receiver is resting on a table top or something similar. In the case of cordless and cell phones, the function of a hook switch is generally emulated by one or several pushbuttons, wherein a user makes an appropriate entry for receiving a call or ending a communication connection. For this, it must be noted that, in the case of the devices mentioned first (hook switch, photoelectric sensor), the corresponding technical device (hook, photoelectric sensor) can also be operated manually, that is, using a finger or a hand, for example, without the telephone receiver actually having to be on-hook.

With the known devices for detecting the status of telephone receivers (and thus also of cellular communications terminals), it has proven to be disadvantageous that complex mechanical and/or electrical systems must be used for detecting the status. This applies to both the mechanically constructed hook switch and the "electronic" solutions with pushbuttons, photoelectric sensors, magnetic contacts, or similar devices. A further disadvantage is that the aforementioned devices (hook switch, photoelectric sensor, etc.) can frequently also be operated manually, which means, for example, that the status "on-hook" can also be erroneously determined when the telephone receiver or the cellular terminal is still located at the user's ear.

BRIEF SUMMARY OF THE INVENTION

It would be helpful if the status of a telephone receiver could be reliably detected using structurally simple means.

Embodiments of the invention provide methods for detecting the status of a telephone receiver for a communications terminal, wherein the telephone receiver is equipped with a microphone and with a loud speaker. A defined tone signal is thereby emitted through the loud speaker of the telephone receiver, and this tone signal is simultaneously received by the microphone of the telephone receiver. The received tone signal is then analyzed, wherein at least one value for at least one parameter of the received tone signal is ascertained and wherein the at least one value is used to determined the status of the telephone receiver.

This method makes it possible to use the technology (signal processing) for detecting the status of the telephone receiver that already exists in a modern communications terminal, without having to provide hook switches, photoelectric sensors, or similar technical devices. Furthermore, the method has the advantage that the communications terminal cannot be manipulated by manually pressing the hook switch or by manually blocking a photoelectric sensor or something similar, so that the status thereby determined is reliable.

The solution of the task also provides a communications terminal with a telephone receiver, wherein the communications terminal is equipped to perform the method according to the invention. Such a communications terminal can be used in a structurally and, above all, mechanically simple manner to reliably recognize/determine the status of the telephone receiver. This also applies to cases in which the communications terminal and the telephone receiver form one component, for example, in cellular telephones and cordless telephones.

On a communications terminal, a hook switch can be eliminated or added if, for the status of the telephone receiver, a distinction is made at least between a receiver that is on-hook or off-hook. Advantageously in the case of an on-hook telephone receiver, a housing of the communications terminal on which the telephone receiver rests or a separate acoustical channel integrated into this housing is generally used for transmitting the tone signal from the loud speaker to the microphone of the telephone receiver. The transmission of the tone signal results in a defined impact of the tone signal in the acoustical channel (transmission path), whereby the determined value for an on-hook telephone receiver can, within narrow limits, be reproduced well. This makes a reliable determination of the status (on-hook) possible. The transmission function of the acoustical channel can thereby be determined even more precisely, the more different tone signals are transmitted and analyzed consecutively or also simultaneously.

Analogous to detecting the status "on-hook"/"off-hook", a distinction can be made for the status of the telephone receiver between touching or not-touching a human body, e.g., in the area of the face/ear.

An important scope of application of the method is given when the method is performed prior to the signaling of an incoming call to the communications terminal by means of a ring tone, wherein the emission of the ring tone occurs through the loud speaker of the telephone receiver and wherein the emission of the ring tone is controlled by the detected status of the telephone receiver. Thus, the method can prevent the loud ring tone from being emitted when the telephone receiver or its loud speaker is touching the ear of a user, which, depending upon the volume, could cause hearing damage. This measure therefore makes it possible to do without a separate loud speaker/buzzer/bell or similar device in the housing of the communications terminal and instead to use the already existing loud speaker of the telephone receiver to emit the ring tone. Thus, when the status of the telephone receiver is detected as "off-hook" or even as "touching a human body", it is advantageous for the ring tone to be emitted at a lower volume (hearing-protective) or with an increasing (warning function) volume, or for an incoming call to be signaled silently. Alternately in these cases, a vibration alarm integrated into the telephone receiver can also be used.

In order to eliminate a hook switch or a similar technical device, the method is advantageously used for detecting a change in the status of the telephone receiver, wherein in the cases in which a "lifting" (thus, a status change from "on-hook" to "taken off the hook") is detected, an acceptance of a signaled call is performed.

In order to analyze the received tone signal, for a simple processing, the at least one determined value is compared to one or several stored reference values, wherein, advantageously, the status is determined using that reference value that is closest to the determined value. For the one-time or also the recurring determination and storing of the reference value or reference values, the communications terminal with the telephone receiver is switched over to the teaching mode, wherein a tone signal is emitted at least once through the loud speaker of the telephone receiver, and this signal is received and analyzed by the microphone of the telephone receiver, wherein the at least one thereby determined value is used to generate one or several of the reference values or is used by the reference value ranges. The reference value is, or the reference values are, thereby characteristic for the acoustical channel (that is, the transmission path) used at any one time. For this reason, a reference value, or a set of reference values, can also advantageously be determined at any one time for different statuses (on-hook, off-hook, receiver on the human body). The volume of the received tone signal, and thus the damping of the acoustical channel, is thus advantageously specified as the parameter, and another or an additional option for the parameter is to determine a value for the "zero-crossing rate" of the tone signal received by the microphone. Such values can also be detected, requiring little computing time, by using simple signal processors that are already built into numerous communications terminals.

In order to minimize or avoid disturbing a user with the tone signal, a tone that is perceived as less disturbing, e.g., a noise signal, can be emitted as the tone signal. This signal can, for example, be evaluated by a Fast Fourier Transformation (FFT). Furthermore, depending upon the transmission range of the microphone and the loud speaker, an ultrasonic signal or an infrasonic signal can also be used. These measures make it possible to also periodically or continuously monitor the status of the telephone receiver during a telephone conversation, so that a "hanging up" of the telephone receiver, which can terminate the communications connection (telephone conversation), can be recognized. A volume adjustment for the playback of the telephone conversation is also therefore possible, so that, depending upon the distance of the telephone receiver from the human ear, there can even be a stepless transition to a "speaker phone mode". Conversely, when the telephone receiver is moved closer to a user's face/ear, the playback volume can naturally be lowered.

Embodiments of the method according to the invention are described below using the drawings. These drawings are also used to describe a communications terminal according to embodiments of the invention.

DETAILED DESCRIPTION OF THE INVENTION

Using the example of a desk telephone as the communications terminal CT, the detection of the status of a telephone receiver TR is described below. Basically, however, the status of a cell phone or similar device can also be detected with the described method, wherein, in such a case, the status "on-hook" does not refer to a receiver resting on a telephone, but rather on a desk top or a special mounting.

Figure 1:
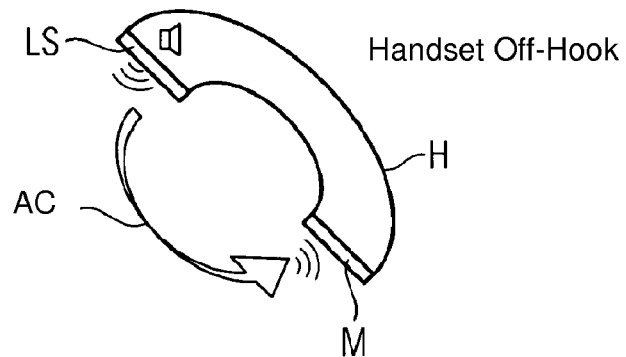
FIG. 1 a telephone receiver with the status "off-hook"
Figure 2:
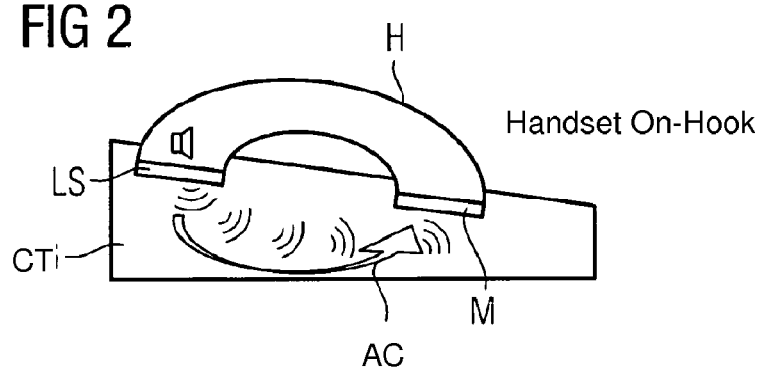
FIG. 2 a telephone receiver that is resting on the housing of a communications terminal, and FIG. 3 a schematic diagram of the method sequence for detecting the status of a telephone receiver.

The telephone receiver TR and the communications terminal CT are shown in FIGS. 1 and 2, and, for the sake of clarity, details, such as, the handset cord, keypad, display, etc., are not shown.

FIG. 1 shows a telephone receiver TR that has a loud speaker LS (earpiece) and a microphone M (mouthpiece). In the embodiment shown here, the loud speaker LS and the microphone M are used for both the actual function of the telephone receiver, namely, for the actual telephone conversation, and the performance of the described method (status recognition). Although this procedure does not require that any separate "hardware" be built into the telephone receiver in order to perform the method, it is naturally also possible to use a separate loud speaker LS and/or microphone M for this purpose.

Sound waves (tone signals, etc.) that are played back from the loud speaker LS of the telephone receiver TR are at least partially received by the microphone M of the telephone receiver TR. This is also called acoustical feedback. The path through which the sound waves pass is called the acoustical channel AC. In the example in FIG. 1 in which the telephone receiver TR is off-hook, one can more or less assume that the loud speaker LS emits the sound with a hemispherical characteristic, so that only a very small portion of the sound waves hits the microphone M. With this "off-hook" status, the acoustical channel AC has a relatively high acoustical damping, precisely because only a very small portion of the emitted sound energy is conducted to the microphone M.

The same telephone receiver TR is shown in FIG. 2, although this time it is resting on the communications terminal CT. In this case, the housing of the communications terminal CT forms the acoustical channel, wherein a large portion of the emitted sound energy (sound waves) from the loud speaker LS is reflected in the housing, primarily on the bottom of the housing, and is thereby conducted to the microphone M. The housing of the communications terminal CT hereby forms an acoustical channel AC that has less damping when compared to the acoustical channel from FIG. 1. In addition to the damping, which directly effects the volume of the sound received by the microphone M, other characteristics of the acoustical channels in FIGS. 1 and 2 differ from one another, for example, the signal propagation delays and the spectral characteristics, wherein the latter means that different frequency ranges are transmitted with different damping. Furthermore, depending upon the construction of the housing, resonances for different frequencies are possible.

In the embodiment shown in FIG. 2, the telephone receiver TR is resting on the housing of the communications terminal CT, so that the sound energy emitted from the loud speaker LS is transmitted initially to the top of the housing and transferred from there, at least partially, to the air volume inside the housing, thus arriving, as described, in the area of the housing on which the microphone M rests, and, finally, is transmitted via the housing back to the microphone M. Part of the sound is also transmitted directly via the housing. Depending upon the embodiment, at the place where the loud speaker LS and/or the microphone M rests, openings or a flexible membrane can be provided for better sound transmission. Furthermore, inside the housing, a separate acoustical channel can also be formed or built-in, in order to ensure a better or other sound transmission (as characteristic as possible).

Figure 3:
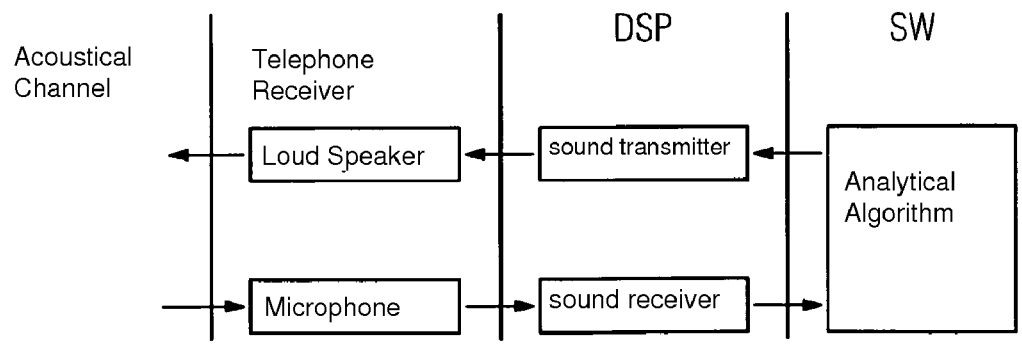

Using FIG. 3, the process of detection will now be described. In addition to the ("environment-dependent") acoustical channel AC and the telephone receiver TR as input and output media for sound signals (tone signals), a digital signal processor DSP and the processor-controlling software SW of the communications terminal CT are examined, wherein one assumes that the digital signal processor DSP and a microprocessor control (not shown here) are already included in most modern communications terminals CT.

A ring tone should be used for signaling a call coming in to the communications terminal, wherein this ring tone should be emitted through the loud speaker LS of the telephone receiver TR. This should eliminate the need for a separate loud speaker, buzzer, bell, or similar device. The microprocessor control of the communications terminal CT determines that the communications terminal CT is in the idle mode, that is, is basically prepared to signal and receive calls. It must, however, be ensured that the telephone receiver H is resting on the housing. For this, a control program transmits a control sequence to the digital signal processor DSP, with which this processor assumes the function of a sound transmitter and generates a tone signal, for example, a sine wave with 440 Hz, wherein this tone is emitted at a defined volume, for example, 25 dB, from the loud speaker LS. After passing through the acoustical channel AC, in this case the housing of the communications terminal CT, the tone signal is received by the microphone M and retransmitted to the digital signal processor DSP, which analyzes the received tone signal and determines the volume as parameter (level), here, for example, 23 dB. This value for the parameter "volume" is compared to a table stored in the communications terminal CT, wherein it is determined that, for example, values between 22 dB and 24 dB are characteristic for the on-hook state of the telephone receiver TR, so that the ring tone can be emitted through the loud speaker LS of the telephone receiver TR without posing a hearing risk for humans.

Normally, the tone signal received by the microphone M is first filtered, in this embodiment with a steep band-pass filter at a "cutoff frequency" of 440 Hz. This filtering can be performed digitally by the DSP. In addition to, or in place of, the damping, the so-called "zero-crossing rate", that is, the portion of the signal-zero points, can also be detected as the parameter, and this value can also be easily detected by simple signal processors (DSP).

In another situation, it can well be that the telephone receiver TR is not resting properly on the communications terminal CT, so that, for example, as in the situation in FIG. 1, a value of 19 dB is measured, which results in the ring tone being emitted with a damped volume or not being emitted at all.

The detection of the status can be (almost) inaudible, and thus also performed during a telephone conversation, when ultrasound or infrasound is used as the tone signal. Also the limiting to short measurements ("tone bursts") and very low signal amplitudes (volumes) is beneficial for this. Finally, during a conversation, the "useful content" of the conversation reproduced by the loud speaker LS can also be used as the tone signal.

In this case, the acoustical signal emitted through the loud speaker LS is compared to the signal received by the microphone M, and, e.g., the level of acoustical feedback (and thus the damping) can be determined from these results. Selected frequency ranges can hereby be analyzed, for example, the known resonance frequencies that occur during an acoustical feedback via the housing of the communications terminal CT.

For programming the reference values into the table for the analytical algorithm, a so-called "teaching mode" can be activated in which, via a menu control or similar prompting, one can enter the actual status of the telephone receiver TR, whereupon, for testing purposes, the tone signal is emitted and the hereby measured value for the parameter (in this case, e.g., damping or volume) is entered into the table. During this process, the fact that measurement accuracies and situation-related inaccuracies can occur is taken into consideration, so that the status is detected even with subsequent slightly deviating values.

Apart from the measurement of the volume and, thus, the damping of the acoustical channel, other parameters can also be detected, for example, resonances can be determined by using a multifrequency signal or a noise signal as the tone signal and by performing a Fast Fourier Transformation (FFT) with the digital signal processor DSP in order to determine the resonance frequencies. In the same way, one can not only differentiate between the statuses "on-hook" and "off-hook", but also, for example, detect the condition when the telephone receiver TR or its loud speaker LS is touching a head/ear, whereby, for example, the emitted tone signal undergoes an increased level of damping. Situational changes can also be detected by repeated detection of the status, which means that a hook switch or a photoelectric sensor or a similar device can be partially or completely eliminated.

The invention claimed is:

1. A method for detecting a status of a telephone receiver for a communications terminal, wherein the telephone receiver is equipped with a microphone and a loud speaker comprising:
    emitting a defined tone signal through the loud speaker of the telephone receiver,
    simultaneously receiving said tone signal at the microphone of the telephone receiver,
    analyzing the received tone signal and ascertaining at least one value for at least one parameter of the received tone signal, and
    determining the status of the telephone receiver using the at least one value.

2. The method of claim 1, comprising:
    for the status of the telephone receiver, distinguishing between an on-hook telephone receiver and an off-hook telephone receiver.

3. The method of claim 2, comprising:
    in the case of the on-hook telephone receiver, transmitting the tone signal from the loud speaker to the microphone of the telephone receiver by a housing of the communications terminal, on which the telephone receiver rests, or by a separate acoustical channel that is integrated into the housing.

4. The method of claim 1, wherein the status of the telephone receiver distinguishes between touching and not-touching a human body.

5. The method of claim 1, comprising:
controlling emission of a ring tone through the loud speaker of the telephone receiver based on the status of the telephone receiver.

6. The method of claim 5, comprising:
when the status of the telephone receiver is detected as at least one of "off-hook" and "touching a human body", emitting the ring tone with a member of the group consisting of lower volume, an increased volume, and a silent signal.

7. The method of claim 1, comprising:
signaling a call; and
accepting the signaled call when the status of the telephone receiver is detected as "lifting."

8. The method of claim 1, comprising:
analyzing the received tone signal by comparing the at least one value with at least one stored reference value.

9. The method of claim 8, comprising:
for a determination and storing of the reference value or reference values, switching the communications terminal with the telephone receiver to a teaching mode, wherein a tone signal is emitted at least once through the loud speaker of the telephone receiver and this tone signal is received by the microphone of the telephone receiver and analyzed by the communication terminal to determine at least one value used to generate one or several reference values.

10. The method of claim 1, wherein volume of the received ring tone is the at least one parameter.

11. The method of claim 1, wherein the at least one parameter is a value for a zero-crossing rate of the ring tone received by the microphone.

12. A communication terminal that performs the method of claim 1.

13. A communications terminal comprising:
a processor unit communicatively coupled to a receiver unit;
the receiver unit comprising a loudspeaker and a microphone, the loudspeaker emitting a defined tone signal and the microphone simultaneously receiving said emitted tone signal;
the processor unit analyzing the received tone signal and ascertaining at least one value for at least one parameter of the received tone signal; and
the processor unit determining a status of the receiver unit using the at least one value.

14. The communications terminal of claim 13, wherein said loudspeaker signals an incoming call using a ring tone played back through the loudspeaker the ring tone being the defined tone signal.

15. The communications terminal of claim 13, comprising a hookswitch on said receiver unit, said receiver unit being a telephone receiver.

16. The communications terminal of claim 13 wherein the processor unit is a digital signal processor and the processor unit ascertains the at least one value for the at least one parameter of the received tone signal by determining a volume as the at least one value for the at least one parameter of the received tone signal and wherein the processor unit determining the status of the telephone receiver using the at least one value by comparing the determined volume to a table stored in the communication terminal.

* * * * *